May 17, 1938.  F. G. G. ARMSTRONG  2,117,645
HYDRAULIC SHOCK ABSORBER AND THE LIKE DAMPING MEANS
Filed Oct. 16, 1936  3 Sheets-Sheet 1
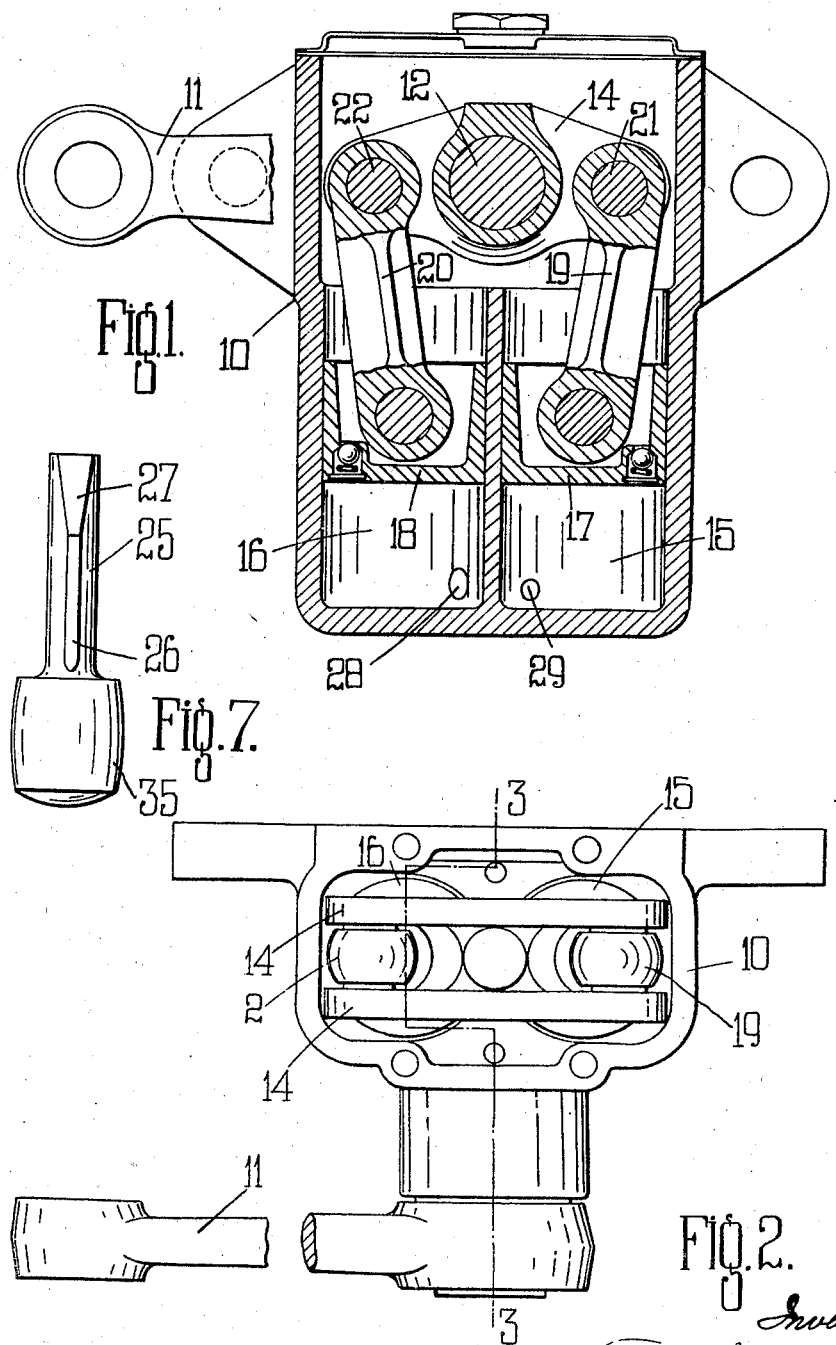

May 17, 1938.  F. G. G. ARMSTRONG  2,117,645
HYDRAULIC SHOCK ABSORBER AND THE LIKE DAMPING MEANS
Filed Oct. 16, 1936  3 Sheets-Sheet 2

Inventor:
Fullerton G. G. Armstrong
By: Mason & Porter
Attorneys

May 17, 1938. F. G. G. ARMSTRONG 2,117,645
HYDRAULIC SHOCK ABSORBER AND THE LIKE DAMPING MEANS
Filed Oct. 16, 1936  3 Sheets-Sheet 3
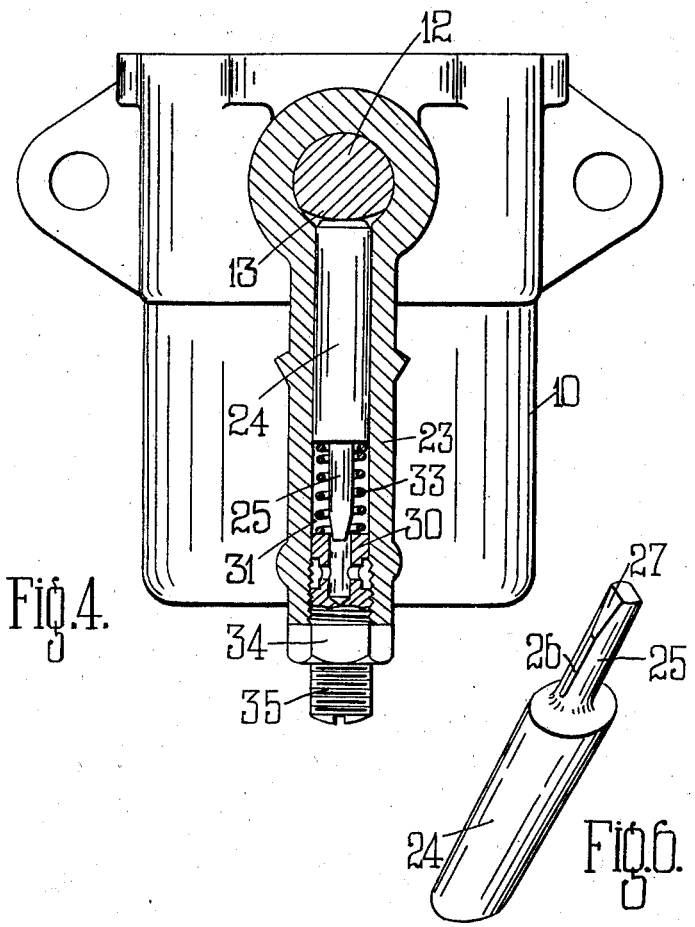
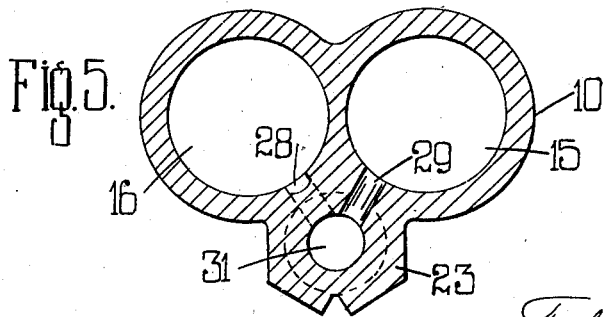

Patented May 17, 1938

2,117,645

UNITED STATES PATENT OFFICE 2,117,645

HYDRAULIC SHOCK ABSORBER AND THE LIKE DAMPING MEANS

Fullerton George Gordon Armstrong, Beverley, England, assignor to Armstrong's Patents Company Limited, Beverley, East Yorkshire, England Application October 16, 1936, Serial No. 106,061
In Great Britain January 16, 1936

6 Claims. (Cl. 188—88)

The present invention relates to hydraulic shock absorbers and the like differential pressure operated damping means of the type wherein the casing of the shock absorber is connected to one of a pair of elements and the shaft of the shock absorber to the other element whose relative displacement with the first element is to be damped and wherein a restricted passage forms a resistance to fluid flow such as for example, between the ends of a cylinder in which a double acting piston operates or again between a pair of cylinders in each of which a piston is displaceable on operation of a shock absorber or further in the rotary or vane type of shock absorber.

The object of the present invention is to provide flow control means which, without risk of damage even by inexperienced users, may be initially adjusted to suit varying conditions of load and road surface for example and may then function to give a variable resistance to fluid flow in accordance with the degree of relative displacement of the members to be damped with which the shock absorber is used.

According to the present invention flow control means in the form of a tapered needle valve is displaceable positively and relatively to a valve seating of greater bore than the maximum cross-section of the valve, said valve displacement being in strict proportion with the relative displacement of the shock absorber parts to vary the cross-sectional area of the restricted passage but without wholly closing it, that is to say, with increase of relative displacement between the parts such as the wheel axle and the frame of the road vehicle the tapered needle valve is displaced by an amount proportional to said displacement of the parts to reduce the cross-sectional area of the restricted passage proportionately and vice versa.

The range of displacement of the tapered needle valve in comparison with a predetermined maximum degree of relative movement of the parts to be damped may be varied by any desired means, that is to say the tapered needle valve may be pre-adjusted as regards its position relatively to a non-tapered valve seating when the means for displacing the valve is in its normal position.

The invention is more particularly described with reference to the accompanying drawings in which:—

Figure 1 is a vertical sectional view through one form of shock absorber of the present invention of the type in which a pair of pistons operate in separate cylinders formed in the shock absorber casing to cause fluid flow through a restricted passage between the cylinder on relative displacement of the vehicle members to be damped on which the shock absorber is mounted.

Figure 2 is a corresponding plan view.

Figure 4 is a vertical sectional view on the line 4—4 of Figure 3.

Figure 5 is a horizontal sectional view on the line 5—5 of Figure 3.

Figure 6 is a perspective view of a tapered needle valve.

Figure 7 is a view of a modified form of valve needle.

Figure 3:
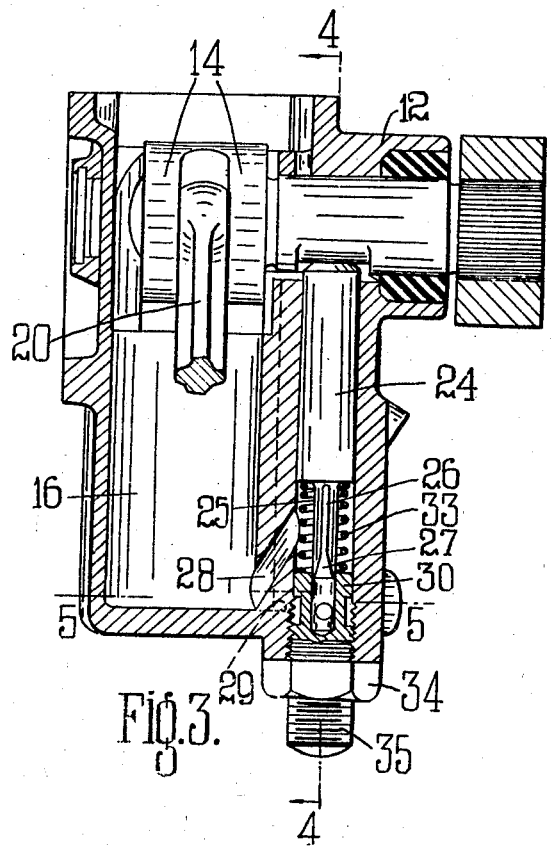
Figure 3 is a vertical sectional view on the line 3—3 of Figure 2.

In the construction according to the drawings, a shock absorber casing 10 is adapted for connection to the chassis of a motor or other vehicle whilst a lever 11 adapted for link connection with an axle of the vehicle, on which the shock absorber is mounted, is rigid with a shaft 12 which has a cam face 13 thereon and carries a crank 14, in the form of a pair of spaced arms or levers of the first order, for angular displacement with the shaft.

A pair of cylinders 15, 16, are formed in the casing within which pistons 17, 18 respectively reciprocate on angular displacement of the shaft 12 and crank 14, the pistons having link connections 19, 20 respectively with said crank for this purpose. The use of the term "link connection" is not meant to include positive connections only, as it will be appreciated that the links 19, 20 may be operatively connected to the crank in any suitable manner which will effect displacement of the pistons on angular displacement of the crank.

A boss 23 extending longitudinally of the casing is internally bored at 31 to receive a tapered needle valve which comprises a spindle 24 and a relatively thin shank 25 the latter of which has opposed flat faces 26 and tapered flat faces 27 at its free end. This tapered needle valve controls a pair of transverse passages 28, 29, between the bore and the cylinders 15, 16, and is displaceable longitudinally of the bore in strict accordance with angular displacement of the cam face 13 on the shaft 12 to vary the cross-sectional area through a valve port 30 within which the tapered end 27 of the valve is displaceable. The valve port 30 establishes connection between the passages 28 and 29, in that it is located in that part of the bore 31 which is bounded by the planes in which the passages 28, 29 merge into the bore. In order that the passages 28, 29 may lead into the extreme ends of the cylinders 16, 15 respectively, the passage 28 is inclined at an acute angle to the longitudinal axis of the bore 31 whilst the passage 29 is at right angles to said axis.

The shaft 12 lies in a direction normal to that of the longitudinal axis of the tapered pin 24, 25, whilst the spindle end 24 is held against the cam face 13 formed on the periphery of the shaft by a spring 33 or other resilient means located between a shoulder of the tapered pin and the valve seating 30. The valve port 30 is formed on a threaded member 35 engaged by an adjustable nut 34 closing that end of said bore 31 remote from the shaft end, so that the initial cross-sectional area available to fluid flow through the transverse passages 28, 29 may be varied by adjustment of the nut.

The maximum diameter of the tapered needle valve at its tapered end 27 is slightly less than that of the valve port 30, whilst the diametrally opposed flat surfaces 27 provide a pair of gaps of varying cross-section between the valve port 30 and the needle valve even should the latter pass into the port during operation of the shock absorber. The diametrally opposed flat surfaces 26 of constant width formed on the thin shank 25 remote from the tapered end constitute relief ports in the event of further adjustment of the nut 34 or excessive longitudinal displacement of the valve needle. In this way the valve is never wholly closed and damage to the shock absorber is prevented during usage irrespective of any inexperienced handling to which the externally operated means may be subjected for adjustment purposes.

In operation, on relative displacement of the elements to be damped by the shock absorber which in the case of a vehicle comprises a vehicle axle and the chassis, the shaft 12 is angularly displaced to angularly displace the crank 14 about the axis of the shaft and thus cause reciprocation of the pistons 17, 18 in their respective cylinders 15, 16. As a result, oil or other liquid is forced out of one cylinder into the other. When the piston 17 is on its compression stroke the oil is forced out of the passage 29 through the port 30 past the valve 25 into the bore 31 and through the passage 28 into the other cylinder 16 whilst when the piston 18 is on its compression stroke, the oil is forced in the reverse direction. In either direction of flow the resistance to flow is varied in strict accordance with the displacement of the pistons by virtue of the cam surface 13 which moves the valve 25 towards and away from the port 30 in accordance with rotation of the shaft 12 but never completely closes the port.

The effective length of the tapered needle valve may be varied by forming the valve shank in two parts with a transverse wedge between the two, the wedge being displaceable in a direction normal to the axis of the tapered needle valve as illustrated in applicant's co-pending application, Serial No. 103,583, filed October 1, 1936. In this way the degree of opening of the valve under normal conditions may be varied to suit particular requirements.

If desired, however, the wedge may be omitted and the valve shank 24 formed in two portions one of which has a barrel shaped end 35 as shown in Figure 7 to enable the tapered end 25 relatively thin or to be self-centred relatively to the valve bore 30.

I declare that what I claim is:—

1. Differential pressure operated damping means for a pair of relatively displaceable members, comprising a casing adapted to be connected to one of said members, a shaft connected to the other of said members, a pair of pistons displaceable on angular rotation of said shaft, a pair of cylinders within said casing and within which said pistons are displaceable, means including a valve seating for providing a restricted passage to the flow of fluid between said cylinders on displacement of said pistons, and a tapered needle valve displaceable toward and away from said valve seating, said needle valve having a tapering flat surface at the tapered end thereof merging into a flat surface of uniform width extending along the shank thereof, whereby to prevent complete closing of the restricted passage.

2. Differential pressure operated damping means for a pair of relatively displaceable members, comprising a casing adapted to be connected to one of said members, a shaft connected to the other of said members, a pair of pistons displaceable on angular rotation of said shaft, a pair of cylinders within said casing and within which said pistons are displaceable, means including a valve seating for providing a restricted passage to the flow of fluid between said cylinders on displacement of said pistons, a tapered needle valve displaceable toward and away from said valve seating, said needle valve having a tapering flat surface at the tapered end thereof merging into a flat surface of uniform width extending along the shank thereof, whereby to prevent complete closing of the restricted passage, and means for externally adjusting the position of said valve seating independently of said valve displacement.

3. Differential pressure operated damping means for a pair of relatively displaceable members, comprising a casing adapted to be connected to one of said members, a shaft connected to the other of said members, a pair of pistons displaceable on angular rotation of said shaft, a pair of cylinders within said casing and within which said pistons are displaceable, restricted passages between said cylinders through which fluid is caused to flow upon displacement of said pistons, a valve seating having a bore therethrough connecting said restricted passages, and a tapered needle valve of a maximum cross-section less than the cross-sectional area of the bore in said valve seating and adapted to be displaced towards and away from said valve seating, said needle valve having a tapering flat surface at the tapered end thereof merging into a flat face of uniform width extending along a shank thereof whereby to prevent complete closure of the bore in said valve seating.

4. Differential pressure operated damping means for a pair of relatively displaceable members, comprising a casing adapted to be connected to one of said members, a shaft connected to the other of said members, a pair of pistons displaceable on angular rotation of said shaft, a pair of cylinders within the casing and within which said pistons are displaceable, said casing having a bore the axis of which is parallel to the axes of said cylinders, means including a valve seating located within said bore for providing a restricted passage between said cylinders, a tapered needle valve longitudinally displaceable in said bore toward and away from said valve seating in accordance with angular rotation of said shaft, said needle valve having a pair of opposed tapering flat surfaces at the tapered end thereof merging into flat faces of uniform width extending along the shank thereof and providing a maximum cross-sectional area for the needle valve which is less than the maximum cross-sectional area of said valve seating whereby to prevent complete closing of the restricted passage between said cylinders, and means located externally of said casing for initially adjusting the position of said valve seating independently of said valve displacement.

5. Differential pressure operated damping means as claimed in claim 4, wherein the bore in said casing lies parallel with and between the axes of said cylinders and lies in a direction at right angles to the axis of said shaft.

6. Differential pressure operated damping means as claimed in claim 1, wherein the casing is provided with a bore and the needle valve is provided with a barrel-shaped portion at the end of the shank located in said bore whereby to facilitate self-alignment of the valve within the casing, and wherein the shaft is provided with a cam face against which the barrel-shaped portion is held by spring means.

FULLERTON GEORGE GORDON ARMSTRONG.